(12) United States Patent
Cho et al.

(10) Patent No.: US 9,518,637 B2
(45) Date of Patent: Dec. 13, 2016

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/838,727

(22) Filed: Aug. 28, 2015

(65) Prior Publication Data
US 2016/0169339 A1 Jun. 16, 2016

(30) Foreign Application Priority Data
Dec. 11, 2014 (KR) .......................... 10-2014-0178390

(51) Int. Cl.
*F16H 3/62* (2006.01)
*F16H 3/66* (2006.01)

(52) U.S. Cl.
CPC ......... *F16H 3/66* (2013.01); *F16H 2200/0069* (2013.01); *F16H 2200/0073* (2013.01);
(Continued)

(58) Field of Classification Search
CPC ................ F16H 3/62; F16H 2200/0073; F16H 2200/2012; F16H 2200/2046
See application file for complete search history.

(56) References Cited

U.S. PATENT DOCUMENTS 8,864,618 B1 * 10/2014 Noh .......................... F16H 3/62
475/278
8,979,701 B2 * 3/2015 Baldwin ................... F16H 3/66
475/276
(Continued)

FOREIGN PATENT DOCUMENTS

JP 2009-197927 A 9/2009
JP 2013-72464 A 2/2013
(Continued)

*Primary Examiner* — Huan Le
(74) *Attorney, Agent, or Firm* — Morgan, Lewis & Bockius LLP

(57) ABSTRACT

A planetary gear train of an automatic transmission for vehicles may include an input shaft receiving torque of an engine, an output shaft outputting changed torque, a first planetary gear set, a second planetary gear set, a third planetary gear set, a fourth planetary gear set, a first rotational shaft selectively connected to a transmission housing, a second rotational shaft directly connected to the input shaft, a third rotational shaft, a fourth rotational shaft, a fifth rotational shaft selectively connected to the first rotational shaft and the second rotational shaft, a sixth rotational shaft directly connected to the output shaft, a seventh rotational shaft selectively connected to the fourth rotational shaft or selectively connected to the transmission housing, an eighth rotational shaft selectively connected to the fifth rotational shaft, six friction elements disposed to selectively connect the rotational shafts or selectively connect the rotational shafts with the transmission housing.

8 Claims, 2 Drawing Sheets

(52) U.S. Cl.
CPC ................ *F16H 2200/2012* (2013.01); *F16H 2200/2046* (2013.01)

(56) References Cited

U.S. PATENT DOCUMENTS

| | | |
|---|---|---|
| 2012/0231917 A1 | 9/2012 | Phillips et al. |
| 2015/0045173 A1* | 2/2015 | Beck ........................ F16H 3/666 475/275 |
| 2016/0053868 A1* | 2/2016 | Beck ........................ F16H 3/666 475/275 |

FOREIGN PATENT DOCUMENTS

| | | |
|---|---|---|
| JP | 2014-77535 A | 5/2014 |
| KR | 10-2014-0046240 A | 4/2014 |

* cited by examiner

FIG. 2

| | C1 | C2 | C3 | C4 | B1 | B2 | GEAR RATIO |
|---|---|---|---|---|---|---|---|
| 1ST | O | O | | | | O | 4.286 |
| 2ND | | O | O | | | O | 2.915 |
| 3RD | O | | O | | | O | 2.500 |
| 4TH | | | O | | O | O | 1.919 |
| 5TH | | | O | O | | O | 1.531 |
| 6TH | | | O | O | O | | 1.199 |
| 7TH | O | | O | O | | | 1.000 |
| 8TH | O | | | O | O | | 0.838 |
| 9TH | | O | | O | O | | 0.767 |
| 10TH | O | O | | | O | | 0.642 |
| 11TH | | O | O | | O | | 0.417 |
| REV | O | | | O | | O | 1.667 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2014-0178390 filed Dec. 11, 2014, the entire contents of which is incorporated herein for all purposes by this reference.

BACKGROUND OF THE INVENTION

1. Field of the Invention

The present invention relates to an automatic transmission for vehicles. More particularly, the present invention relates to a planetary gear train of an automatic transmission of a vehicle which improves power delivery performance and reduces fuel consumption by achieving eleven forward speed stages using a minimum number of constituent elements.

2. Description of Related Art

In recent years, a rise in oil price causes a rise in competition for technologies to enhance fuel efficiency.

As a result, research into reduction of weight and enhancement of fuel efficiency through down-sizing is being conducted in the case of an engine and research for simultaneously securing operability and fuel efficiency competitiveness through multi-stages is being conducted in the case of an automatic transmission.

However, in the automatic transmission, as a transmission stage increases, the number of internal components increases, and as a result, mountability, transmission efficiency, and the like may still deteriorate and cost, and weight may increase.

Accordingly, development of a planetary gear train which may bring about maximum efficiency with as small a number of components may be important in order to increase a fuel efficiency enhancement effect through the multi-stages.

In this aspect, in recent years, 8 and 9-speed automated transmissions tend to be achieved and the research and development of a planetary gear train capable of implementing more transmission stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving eleven forward speed stages and one reverse speed stage using minimum number of constituent elements and of improving silent driving using a driving point positioned at a low engine speed.

According to various aspects of the present invention, a planetary gear train of an automatic transmission for vehicles may include an input shaft receiving torque of an engine, an output shaft outputting changed torque, a first planetary gear set having a first sun gear, a first planet carrier, and a first ring gear, a second planetary gear set having a second sun gear, a second planet carrier, and a second ring gear, a third planetary gear set having a third sun gear, a third planet carrier, and a third ring gear, a fourth planetary gear set having a fourth sun gear, a fourth planet carrier, and a fourth ring gear, a first rotational shaft having the first sun gear and selectively connected to a transmission housing, a second rotational shaft having the first planet carrier and directly connected to the input shaft, a third rotational shaft having the first ring gear, the second planet carrier, the third sun gear, and the fourth sun gear, a fourth rotational shaft having the second sun gear, a fifth rotational shaft having the second ring gear and selectively connected to the first rotational shaft and the second rotational shaft, a sixth rotational shaft having the fourth planet carrier and directly connected to the output shaft, a seventh rotational shaft having the third planet carrier, and the fourth ring gear and selectively connected to the fourth rotational shaft or selectively connected to the transmission housing, an eighth rotational shaft having the third ring gear and selectively connected to the fifth rotational shaft, and six friction elements disposed to selectively connect the rotational shafts or selectively connect the rotational shafts with the transmission housing.

Each of the first, second, third, and fourth planetary gear sets respectively may include a single-pinion planetary gear set.

The first, second, third, and fourth planetary gear sets may be disposed sequentially from an engine side.

The six friction elements may include a first clutch interposed between the second rotational shaft and the fifth rotational shaft, a second clutch interposed between the fourth rotational shaft and the seventh rotational shaft, a third clutch interposed between the first rotational shaft and the fifth rotational shaft, a forth clutch interposed between the fifth rotational shaft and the eighth rotational shaft, a first brake interposed between the first rotational shaft and the transmission housing, and a second brake interposed between the seventh rotational shaft and the transmission housing.

Shift speeds achieved by selectively operating the six friction elements may include a first forward speed stage achieved by simultaneously operating the first and second clutches and the second brake, a second forward speed stage achieved by simultaneously operating the second and third clutches, and the second brake, a third forward speed stage achieved by simultaneously operating the first and third clutches and the second brake, a fourth forward speed stage achieved by simultaneously operating the third clutch and the first and second brakes, a fifth forward speed stage achieved by simultaneously operating the third and fourth clutches and the second brake, a sixth forward speed stage achieved by simultaneously operating the third and fourth clutches and the first brake, a seventh forward speed stage achieved by simultaneously operating the first, third and fourth clutches, an eighth forward speed stage achieved by simultaneously operating the first and fourth clutches and the first brake, a ninth forward speed stage achieved by simultaneously operating the second and fourth clutches and the first brake, a tenth forward speed stage achieved by simultaneously operating the first and second clutches and the first brake, an eleventh forward speed stage achieved by simultaneously operating the second and third clutches and the first brake, and a reverse speed achieved by simultaneously operating the first and fourth clutches and the second brake.

According to various aspects of the present invention, a planetary gear train of an automatic transmission for vehicles may include an input shaft receiving power of an engine, an output shaft outputting transmitted power, a first planetary gear set having a first sun gear, a first planet carrier, and a first ring gear, a second planetary gear set having a second sun gear, a second planet carrier, and a second ring gear, a third planetary gear set having a third sun gear, a third planet carrier, and a third ring gear, a fourth planetary gear set having a fourth sun gear, a fourth planet carrier, and a fourth ring gear, a first clutch selectively connecting the first planet carrier with the second ring gear, a second clutch selectively connecting the second sun gear with the third planet carrier, a third clutch selectively connecting the first sun gear with the second ring gear, a fourth clutch selectively connecting the second ring gear with the third ring gear, a first brake selectively connecting the first sun gear to the transmission housing, a second brake selectively connecting the third planet carrier and the fourth ring gear to the transmission housing, in which the input shaft may be directly connected to the first planet carrier, the output shaft may be directly connected to the fourth planet carrier, the first ring gear, the second planet carrier, the third sun gear, and the fourth sun gear may be directly connected to each other, and the fourth ring gear may be directly connected to the third planet carrier.

Shift speeds achieved by selectively operating the clutches and the brakes may include a first forward speed stage achieved by simultaneously operating the first and second clutches and the second brake, a second forward speed stage achieved by simultaneously operating the second and third clutches, and the second brake, a third forward speed stage achieved by simultaneously operating the first and third clutches and the second brake, a fourth forward speed stage achieved by simultaneously operating the third clutch and the first and second brakes, a fifth forward speed stage achieved by simultaneously operating the third and fourth clutches and the second brake, a sixth forward speed stage achieved by simultaneously operating the third and fourth clutches and the first brake, a seventh forward speed stage achieved by simultaneously operating the first, third and fourth clutches, an eighth forward speed stage achieved by simultaneously operating the first and fourth clutches and the first brake, a ninth forward speed stage achieved by simultaneously operating the second and fourth clutches and the first brake, a tenth forward speed stage achieved by simultaneously operating the first and second clutches and the first brake, an eleventh forward speed stage achieved by simultaneously operating the second and third clutches and the first brake, and a reverse speed achieved by simultaneously operating the first and fourth clutches and the second brake.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission stages of respective friction elements applied to the exemplary planetary gear train according to the present invention.

Figure 1:
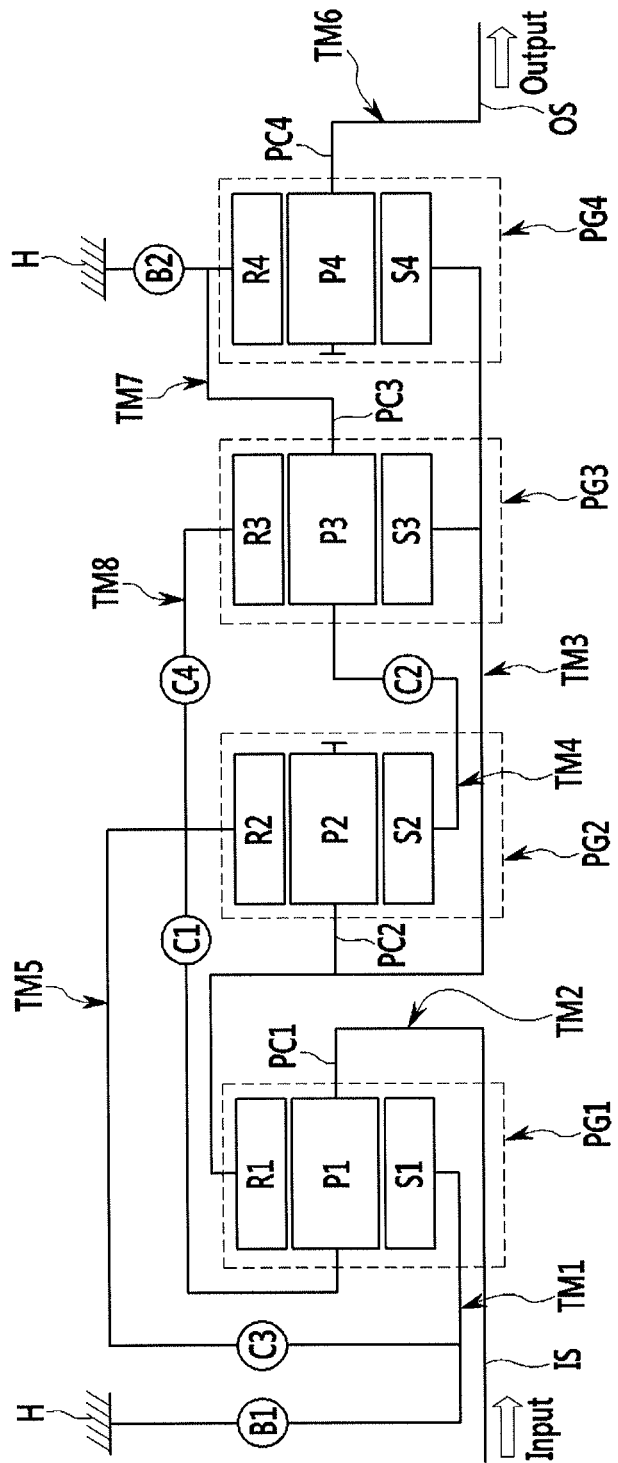
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes a first, second, third, and fourth planetary gear sets PG1, PG2, PG3, and PG4 disposed on the same axis, and an input shaft IS, an output shaft OS, eight rotational shafts TM1 to TM8 directly connecting to each other respective rotation elements of the first, second, third, fourth, and fifth planetary gear sets PG1, PG2, PG3, and PG4, six friction elements C1 to C4 and B1 to B2, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member and rotational power from a crankshaft of an engine is torque-converted through a torque converter to be input into the input shaft IS.

The output shaft OS as an output member is disposed on the same axial line as the input shaft IS and transfers transmitted driving torque to a driving shaft through a differential apparatus.

The first planetary gear set PG1 as a single-pinion planetary gear set includes a first sun gear S1, a first planetary carrier PC1 that supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that supports a second pinion P2 which outer-engages with the second sun gear S2, and a second ring gear R2 which inner-engages with the second pinion P2.

The third planetary gear set PG3 as a single-pinion planetary gear set includes a third sun gear S3, a third planetary carrier PC3 that supports a third pinion P3 which outer-engages with the third sun gear S3, and a third ring gear R3 which inner-engages with the third pinion P3.

The fourth planetary gear set PG4 as a single-pinion planetary gear set includes a fourth sun gear S4, a fourth planetary carrier PC4 that supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, one or more rotation elements are directly connected to each other to operate with a total of eight rotational shafts TM1 to TM8.

Two rotation elements in each of the third and fourth planetary gear set PG3 and PG4 are directly connected to each other. The third and fourth planetary gear set PG3 and PG4 operate as one compound planetary gear set including four rotation elements.

Configurations of the eight rotational shafts TM1 to TM8 will be described below.

The first rotational shaft TM1 includes the first sun gear S1 and is selectively connected to the transmission housing H.

The second rotational shaft TM2 includes the first planet carrier PC1 and is directly connected to the input shaft IS so as to be always operated as an input element.

The third rotational shaft TM3 includes the first ring gear R1, the second planet carrier PC2, the third and fourth sun gear S3 and S4.

The fourth rotational shaft TM4 includes the second sun gear S2.

The fifth rotational shaft TM5 includes the second ring gear R2 and is selectively connected to the first rotational shaft TM1 and the second rotational shaft TM2.

The sixth rotational shaft TM6 includes the fourth planetary carrier PC4 and is directly connected to the output shaft OS and is directly connected to the output shaft OS so as to be always operated as an output element.

The seventh rotational shaft TM7 includes the third planetary carrier PC3 and the fourth ring gear R4 and is selectively connected to the fourth rotational shaft TM4 and selectively connected to transmission housing H.

The eighth rotational shaft TM8 includes the third ring gear R3 and is selectively connected to the fifth rotational shaft TM5.

In addition, among the rotational shafts TM1 to TM8, four clutches C1, C2, C3, and C4 which are friction elements are disposed at portions where the rotational shafts are selectively connected to each other.

Further, among the rotational shafts TM1 to TM8, two brakes B1 and B2 which are the friction elements are disposed at portions selectively connected to the transmission housing H.

Layout positions of the six friction elements C1 to C4 and B1 to B2 will be described below.

The first clutch C1 is interposed between the second rotational shaft TM2 and the fifth rotational shaft TM5, and selectively connects the second rotational shaft TM2 with the fifth rotational shaft TM5.

The second clutch C2 is interposed between the fourth rotational shaft TM4 and the seventh rotational shaft TM7, and selectively connects the fourth rotational shaft TM4 with the seventh rotational shaft TM7.

The third clutch C3 is interposed between the first rotational shaft TM1 and the fifth rotational shaft TM5, and selectively connects the first rotational shaft TM1 with the fifth rotational shaft TM5.

The fourth clutch C4 is interposed between the fifth rotational shaft TM5 and the eighth rotational shaft TM8, and selectively connects the fifth rotational shaft TM5 with the eighth rotational shaft TM8.

The first brake B1 is interposed between the first rotational shaft TM1 and the transmission housing H, and causes the first rotational shaft TM1 to be operated as the selective fixed element.

The second brake B2 is interposed between the seventh rotational shaft TM7 and the transmission housing H, and causes the seventh rotational shaft TM7 to be operated as the selective fixed element.

The friction elements including the first, second, third, and fourth clutches C1, C2, C3, and C4 and the first and second brakes B1 and B2 may be multi-plates friction elements of wet type that are operated by hydraulic pressure.

FIG. 2 is an operation table for each of gear stages of respective friction elements applied to the planetary gear train according to various embodiments of the present invention.

As shown in FIG. 2, in the planetary gear train according to various embodiments of the present invention, while three friction elements operate in the respective gear stages, a transmission is performed.

A first forward speed stage 1ST is achieved by simultaneously operating the first and second clutch C1 and C2, and the second brakes B2.

A second forward speed stage 2ND is achieved by simultaneously operating the second and third clutch C2 and C3, and the second brakes B2.

A third forward speed stage 3RD is achieved by simultaneously operating the first and third clutch C1 and C3, and the second brakes B2.

A fourth forward speed stage 4TH is achieved by simultaneously operating the third clutch C3 and the first and second brakes B1 and B2.

A fifth forward speed stage 5TH is achieved by simultaneously operating the third and fourth clutch C3 and C4, and the second brakes B2.

A sixth forward speed stage 6TH is achieved by simultaneously operating the third and fourth clutch C3 and C4, and the first brakes B1.

A seventh forward speed stage 7TH is achieved by simultaneously operating the first, third and fourth clutch C1, C3 and C4.

An eighth forward speed stage 8TH is achieved by simultaneously operating the first and fourth clutch C1 and C4, and the first brakes B1.

A ninth forward speed stage 9TH is achieved by simultaneously operating the second and fourth clutch C2 and C4, and the first brakes B1.

A tenth forward speed stage 10TH is achieved by simultaneously operating the first and second clutch C1 and C2, and the first brakes B1.

An eleventh forward speed stage 11TH is achieved by simultaneously operating the second and third clutch C2 and C3, and the first brakes B1.

A reverse speed REV is achieved by simultaneously operating the first and fourth clutch C1 and C4, and the second brakes B2.

Hereinafter, the transmission process will be described in detail.

In the first forward speed stage 1ST, the first and second clutch C1 and C2 and the second brake B2 are simultaneously operated. Thus, while the second rotational shaft TM2 is connected to the seventh rotational shaft TM7 by operation of the first clutch C1 and the fourth rotational shaft TM4 is connected to the seventh rotational shaft TM7 by operation of the second clutch C2, the input is made into the second rotational shaft TM2, and the seventh rotational shaft TM7 operates as the fixation element by operation of the second brake B2. As a result, the first forward speed stage 1ST of which the output is the sixth rotational shaft TM6 is performed.

In the second forward speed stage 2ND, the second and third clutch C2 and C3 and the second brakes B2 are simultaneously operated. Thus, while the fourth rotational shaft TM4 is connected to the seventh rotational shaft TM7 by operation of the second clutch C2 and the first rotational shaft TM1 is connected to the fifth rotational shaft TM5 by operation of the third clutch C3, the input is made into the second rotational shaft TM2, and the seventh rotational shaft TM7 operates as the fixation element by operation of the second brake B2. As a result, the second forward speed stage 2ND of which the output is the sixth rotational shaft TM6 is performed.

In the third forward speed stage 3RD, the first and third clutch C1 and C3 and the second brake B2 are simultaneously operated. Thus, while the second rotational shaft TM2 is connected to the fifth rotational shaft TM5 by operation of the first clutch C1 and the first rotational shaft TM1 is connected to the fifth rotational shaft TM5 by operation of the third clutch C3, the input is made into the second rotational shaft TM2, and the seventh rotational shaft TM7 operates as the fixation element by operation of the second brake B2. As a result, the third forward speed stage 3RD of which the output is the sixth rotational shaft TM6 is performed.

In the fourth forward speed stage 4TH, the third clutch C3 and the first and second brakes B1 and B2 are simultaneously operated. Thus, while the first rotational shaft TM1 is connected to the fifth rotational shaft TM5 by operation of the third clutch C3, the input is made into the second rotational shaft TM2, and the first rotational shaft TM1, and the seventh rotational shaft TM7 operates as the fixation element by operation of the first and second brake B1 and B2. As a result, the fourth forward speed stage 4th of which the output is the sixth rotational shaft TM6 is performed.

In the fifth forward speed stage 5TH, the third and fourth clutch C3 and C4 and the second brake B2 are simultaneously operated. Thus, while the first rotational shaft TM1 is connected to the fifth rotational shaft TM5 by operation of the third clutch C3 and the fifth rotational shaft TM5 is connected to the eighth rotational shaft TM8 by operation of the fourth clutch C4, the input is made into the second rotational shaft. TM2, and the seventh rotational shaft TM7 operates as the fixation element by operation of the second brake B2. As a result, the fifth forward speed stage 5TH of which the output is the sixth rotational shaft TM6 is performed.

In the sixth forward speed stage 6TH, the third and fourth clutch C3 and C4 and the first brake B1 are simultaneously operated. Thus, while the first rotational shaft TM1 is connected to the fifth rotational shaft TM5 by operation of the third clutch C3 and the fifth rotational shaft TM5 is connected to the eighth rotational shaft TM8 by operation of the fourth clutch C4, the input is made into the second rotational shaft TM2, and the first rotational shaft TM1 operates as the fixation element by operation of the first brake B1. As a result, the sixth forward speed stage 6TH of which the output is the sixth rotational shaft TM6 is performed.

In the seventh forward speed stage 7TH, the first and third, and fourth clutch C1, C3, and C4 are simultaneously operated. Thus, while the second rotational shaft TM2 is connected to the fifth rotational shaft TM5 by operation of the first clutch C1 and the first rotational shaft TM1 is connected to the fifth rotational shaft TM5 by operation of the third clutch C3 and the fifth rotational shaft TM5 is connected to the eighth rotational shaft TM8 by operation of the fourth clutch C4, and the input is made into the second rotational shaft TM2. As a result, in a state of direct coupling as a whole, the seventh forward speed stage 7TH of which the output is the sixth rotational shaft TM6 as received from the input is performed.

In the eighth forward speed stage 8TH, the first and fourth clutch C1 and C4 and the first brake B1 are simultaneously operated. Thus, while the second rotational shaft TM2 is connected the fifth rotational shaft TM5 by operation of the first clutch C1 and the fifth rotational shaft TM5 is connected to the eighth rotational shaft TM8 by operation of the fourth clutch C4, the input is made into the second rotational shaft TM2, and the first rotational shaft TM1 operates as the fixation element by operation of the first brake B1. As a result, the eighth forward speed stage 8TH of which the output is the sixth rotational shaft TM6 is performed.

In the ninth forward speed stage 9TH, the second and fourth clutch C2 and C4 and the first brake B1 are simultaneously operated. Thus, while the fourth rotational shaft TM4 is connected the seventh rotational shaft TM7 by operation of the second clutch C2 and the fifth rotational shaft TM5 is connected to the eighth rotational shaft TM8 by operation of the fourth clutch C4, the input is made into the second rotational shaft TM2, and the first rotational shaft TM1 operates as the fixation element by operation of the first brake B1. As a result, the ninth forward speed stage 9TH of which the output is the sixth rotational shaft TM6 is performed.

In the tenth forward speed stage 10TH, the first and second clutch C1 and C2 and the first brake B1 are simultaneously operated. Thus, while the second rotational shaft TM2 is connected the fifth rotational shaft TM5 by operation of the first clutch C1 and the fourth rotational shaft TM4 is connected to the seventh rotational shaft TM7 by operation of the second clutch C2, the input is made into the second rotational shaft TM2, and the first rotational shaft TM1 operates as the fixation element by operation of the first brake B1. As a result, the tenth forward speed stage 10TH of which the output is the sixth rotational shaft TM6 is performed.

In the eleventh forward speed stage 11TH, the second and third clutch C2 and C3 and the first brake B1 are simultaneously operated. Thus, while the fourth rotational shaft TM4 is connected the seventh rotational shaft TM7 by operation of the second clutch C2 and first rotational shaft TM1 is connected to the fifth rotational shaft TM5 by operation of the third clutch C3, the input is made into the second rotational shaft TM2, and the first rotational shaft TM1 operates as the fixation element by operation of the first brake B1. As a result, the eleventh forward speed stage 11TH of which the output is the sixth rotational shaft TM6 is performed.

In the reverse speed REV, the first and fourth clutches C1 and C4 and the second brake B2 are simultaneously operated. Thus, while the second rotational shaft TM2 is connected the fifth rotational shaft TM5 by operation of the first clutch C1 and the fifth rotational shaft TM5 is connected the eighth rotational shaft TM8 by operation of the fourth clutch C4, the input is made into the second rotational shaft TM2, and the seventh rotational shaft TM7 operates as the fixation element by operation of the second brake B2. As a result, the reverse speed REV of which the output is the sixth rotational shaft TM6 is performed.

As described above, in the planetary gear train according to various embodiments of the present invention, four planetary gear sets PG1, PG2, PG3, and PG4 may implement the 11 forward speeds and 1 reverse speed transmission stages through the operation-control of four clutches C1, C2, C3, and C4 and two brakes B1, and B2.

Further, the planetary gear train according to various embodiments of the present invention may improve the power transmission efficiency and the fuel efficiency through the multi-stages of the automatic transmission.

Also, silent drivability of vehicle may be improved greatly through the multi-stages of the automatic transmission appropriate to the engine rotation speed.

In addition, since three friction elements operate at each speed and the number of non-operating friction elements is minimized, a friction drag loss is decreased. Therefore, drag torque and power loss may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
an input shaft receiving torque of an engine;
an output shaft outputting changed torque;
a first planetary gear set having a first sun gear, a first planet carrier and a first ring gear;
a second planetary gear set having a second sun gear, a second planet carrier and a second ring gear;
a third planetary gear set having a third sun gear, a third planet carrier and a third ring gear;
a fourth planetary gear set having a fourth sun gear, a fourth planet carrier and a fourth ring gear;
a first rotational shaft having the first sun gear and selectively connected to a transmission housing;
a second rotational shaft having the first planet carrier and directly connected to the input shaft;
a third rotational shaft having the first ring gear, the second planet carrier, the third sun gear, and the fourth sun gear;
a fourth rotational shaft having the second sun gear;
a fifth rotational shaft having the second ring gear and selectively connected to the first rotational shaft and the second rotational shaft;
a sixth rotational shaft having the fourth planet carrier and directly connected to the output shaft;
a seventh rotational shaft having the third planet carrier, and the fourth ring gear and selectively connected to the fourth rotational shaft or selectively connected to the transmission housing;
an eighth rotational shaft having the third ring gear and selectively connected to the fifth rotational shaft; and
six friction elements each disposed to selectively connect the rotational shafts or selectively connect at least one of the rotational shafts with the transmission housing, the six friction elements comprising:
a first clutch interposed between the second rotational shaft and the fifth rotational shaft;
a second clutch interposed between the fourth rotational shaft and the seventh rotational shaft;
a third clutch interposed between the first rotational shaft and the fifth rotational shaft;
a fourth clutch interposed between the fifth rotational shaft and the eighth rotational shaft;
a first brake interposed between the first rotational shaft and the transmission housing; and
a second brake interposed between the seventh rotational shaft and the transmission housing.

2. The planetary gear train of claim 1, wherein each of the first, second, third, and fourth planetary gear sets respectively comprise a single-pinion planetary gear set.

3. The planetary gear train of claim 1, wherein the first, second, third, and fourth planetary gear sets are disposed sequentially from an engine side.

4. The planetary gear train of claim 1, wherein
shift speeds achieved by selective operation of the six friction elements in combinations of three comprise:
a first forward speed achieved by simultaneously operating the first and second clutches and the second brake;
a second forward speed achieved by simultaneously operating the second and third clutches, and the second brake;
a third forward speed achieved by simultaneously operating the first and third clutches and the second brake;
a fourth forward speed achieved by simultaneously operating the third clutch and the first and second brakes;
a fifth forward speed achieved by simultaneously operating the third and fourth clutches and the second brake;
a sixth forward speed achieved by simultaneously operating the third and fourth clutches and the first brake;
a seventh forward speed achieved by simultaneously operating the first, third and fourth clutches;
an eighth forward speed achieved by simultaneously operating the first and fourth clutches and the first brake;
a ninth forward speed achieved by simultaneously operating the second and fourth clutches and the first brake;
a tenth forward speed achieved by simultaneously operating the first and second clutches and the first brake;
an eleventh forward speed achieved by simultaneously operating the second and third clutches and the first brake; and
a reverse speed achieved by simultaneously operating the first and fourth clutches and the second brake.

5. A planetary gear train of an automatic transmission for vehicles, comprising:
an input shaft receiving power of an engine;
an output shaft outputting transmitted power;
a first planetary gear set having a first sun gear, a first planet carrier, and a first ring gear;
a second planetary gear set having a second sun gear, a second planet carrier, and a second ring gear;

a third planetary gear set having a third sun gear, a third planet carrier, and a third ring gear;
a fourth planetary gear set having a fourth sun gear, a fourth planet carrier, and a fourth ring gear;
a first clutch selectively connecting the first planet carrier with the second ring gear;
a second clutch selectively connecting the second sun gear with the third planet carrier;
a third clutch selectively connecting the first sun gear with the second ring gear;
a fourth clutch selectively connecting the second ring gear with the third ring gear;
a first brake selectively connecting the first sun gear to a transmission housing; and
a second brake selectively connecting the third planet carrier and the fourth ring gear to the transmission housing, wherein:
the input shaft is directly connected to the first planet carrier,
the output shaft is directly connected to the fourth planet carrier,
the first ring gear, the second planet carrier, the third sun gear, and the fourth sun gear are directly connected to each other, and
the fourth ring gear is directly connected to the third planet carrier.

6. The planetary gear train of claim 5, wherein the first, second, third, and fourth planetary gear sets each comprise a single-pinion planetary gear set.

7. The planetary gear train of claim 5, wherein the first, second, third, and fourth planetary gear sets are sequentially disposed from an engine side.

8. The planetary gear train of claim 5, wherein
shift speeds achieved by selective operation of four clutches and two brakes in combinations of three comprise:
a first forward speed achieved by simultaneously operating the first and second clutches and the second brake;
a second forward speed achieved by simultaneously operating the second and third clutches, and the second brake;
a third forward speed achieved by simultaneously operating the first and third clutches and the second brake;
a fourth forward speed achieved by simultaneously operating the third clutch and the first and second brakes;
a fifth forward speed achieved by simultaneously operating the third and fourth clutches and the second brake;
a sixth forward speed achieved by simultaneously operating the third and fourth clutches and the first brake;
a seventh forward speed achieved by simultaneously operating the first, third and fourth clutches;
an eighth forward speed achieved by simultaneously operating the first and fourth clutches and the first brake;
a ninth forward speed achieved by simultaneously operating the second and fourth clutches and the first brake;
a tenth forward speed achieved by simultaneously operating the first and second clutches and the first brake;
an eleventh forward speed achieved by simultaneously operating the second and third clutches and the first brake; and
a reverse speed achieved by simultaneously operating the first and fourth clutches and the second brake.

* * * * *